Sept. 30, 1958 K. R. BETTS 2,853,933
HEATING, VENTILATING AND DEFROSTING SYSTEM FOR VEHICLES
Filed Jan. 12, 1954 3 Sheets-Sheet 1

INVENTOR
Kenneth R Betts
BY
C. H. Dibble
ATTORNEY

Sept. 30, 1958 K. R. BETTS 2,853,933
HEATING, VENTILATING AND DEFROSTING SYSTEM FOR VEHICLES
Filed Jan. 12, 1954 3 Sheets-Sheet 2
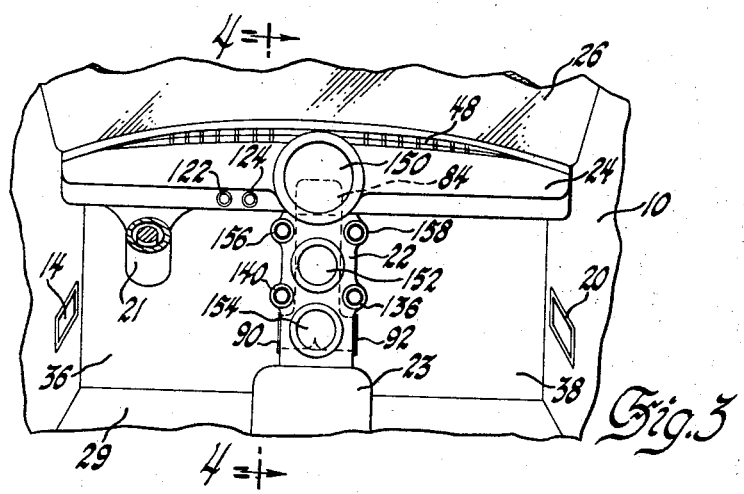
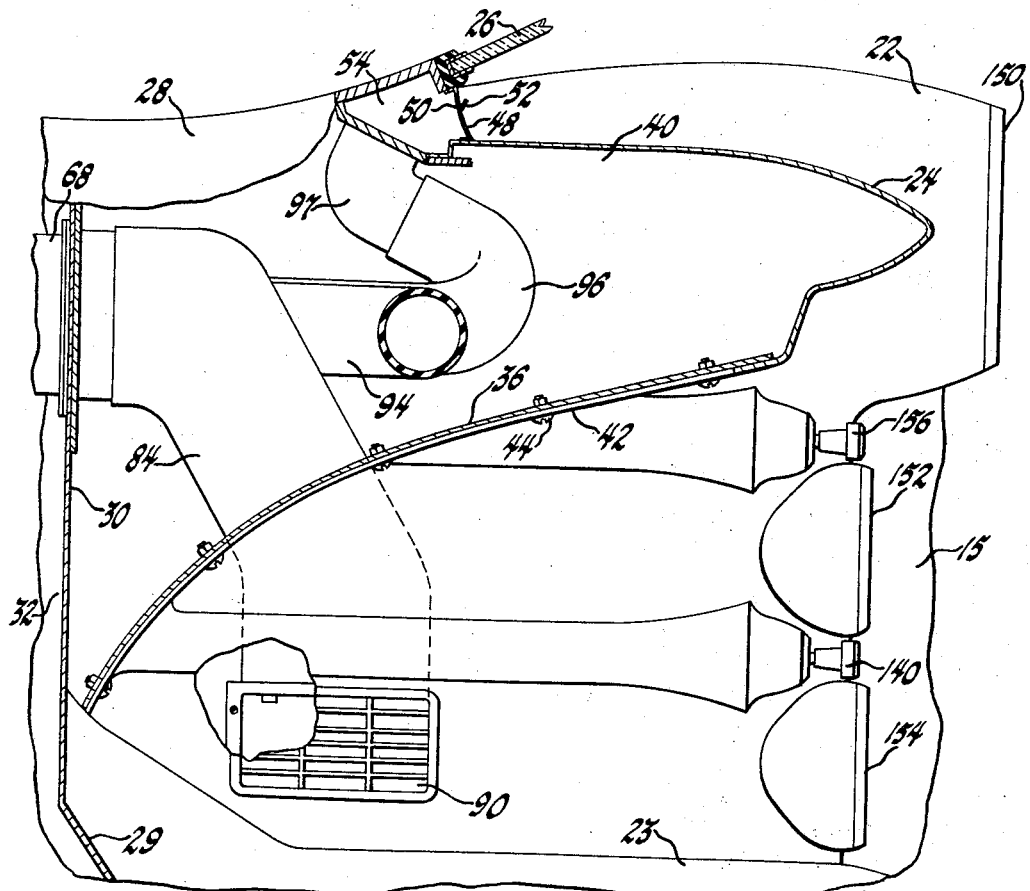
INVENTOR
Kenneth R. Betts
BY
ATTORNEY Sept. 30, 1958 K. R. BETTS 2,853,933
HEATING, VENTILATING AND DEFROSTING SYSTEM FOR VEHICLES
Filed Jan. 12, 1954 3 Sheets-Sheet 3

INVENTOR.
Kenneth R. Betts
BY
ATTORNEY

United States Patent Office 2,853,933
Patented Sept. 30, 1958

2,853,933

HEATING, VENTILATING AND DEFROSTING SYSTEM FOR VEHICLES

Kenneth R. Betts, Detroit, Mich., assignor to General Motors Corporation, Detroit, Mich., a corporation of Delaware Application January 12, 1954, Serial No. 403,489

1 Claim. (Cl. 98—2)

This invention relates to systems for conditioning air admitted to vehicles and more particularly to systems for introducing heating, ventilating or defrosting air to automotive vehicles.

In the use of conventional heating systems for automotive vehicles a difficulty has arisen in that localized portions of the passenger compartment would become unduly heated or subject to drafts whereas other portions of the compartment would be cold or unaffected by the system. This condition is aggravated when the vehicle is of the sport roadster type and particularly when fabric tops are relied upon for protection in inclement weather.

It has now been found that a means may be provided to ensure that conditioned air may be directed to and made effective in those zones where most needed. Despite the use of either a closed or a more or less open vehicle body, it has been found advantageous to separate a portion of the passenger compartment so that each passenger occupies his own at least partially defined zone to which the conditioned air may be directly guided.

It is an object of the present invention to provide an improved heating, ventilating and defrosting system for directly effecting individual spaces or zones in a passenger compartment of an automotive vehicle.

Another object of the invention is to provide an improved heating, ventilating and defrosting system which, although not limited thereto, is particularly adapted for use in sport cars of the roadster type and which provides an aesthetic appearance as well as effective operating characteristics.

To these ends, a feature of the present invention resides in a central and vertical housing enclosing a heating duct and extending longitudinally of the vehicle and arranged in the passenger compartment.

Another feature of the invention is a duct having a fan and a heater associated therewith for guiding air to a chamber mounted on the engine side of a vehicle fire wall in combination with valved connections to means for conducting air to separate zones of the passenger compartment and to means for defrosting the vehicle windshield.

These and other important features of the invention will now be described in detail in the specification and then pointed out more particularly in the appended claim.

In the drawings:

Fig. 3 is an elevational view looking in the directions of the arrows 3—3 in Fig. 1;

Fig. 4 is an enlarged view with the major portion thereof taken along the line 4—4 in Fig. 3.

Figure 1:
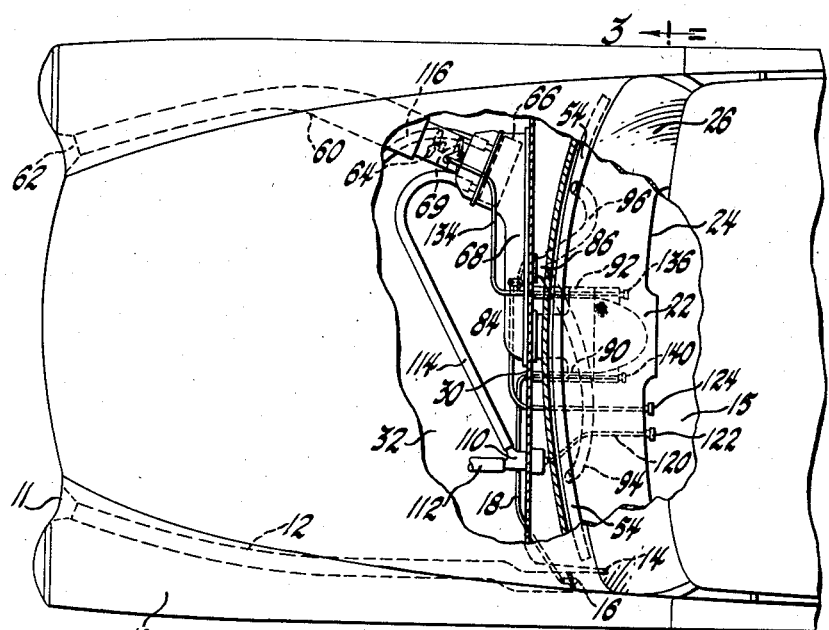
Fig. 1 is a plan view of the front half of an automotive vehicle, a portion being broken away better to illustrate the installation of a system in which the present invention is embodied.

In the drawings, an automotive vehicle 10 is shown in which a conduit 12 is arranged to conduct air from a front portion 11 of the vehicle to an opening 14 leading into the left side of the passenger compartment 15. A butterfly valve 16 is pivotally arranged within the conduit 12 to control air flow and is adapted to be actuated by a Bowden wire and sheath arrangement 18. Opposite the opening 14 and within the passenger compartment 15 is placed an escutcheon plate 20 for simulating a second fresh air opening or air inlet. If desired, an effective second fresh air opening could be utilized but in the present instance, the plate 20 constitutes merely a dummy air discharge to give a balanced appearance to the vehicle interior. A portion of a steering column 21 is shown in Fig. 3.

A vertical and centrally disposed housing 22 is arranged longitudinally of the vehicle 10 and extends from the floor or transmission housing 23 up to and above an instrument panel 24. The panel 24 extends rearwardly from points beneath and adjacent the base of a windshield 26. The cowl 28 of the vehicle is traversed by a fire wall 30 which separates an engine compartment 32 from the passenger compartment 15. A toe board 29 is upwardly inclined and intersects the fire wall. Thin sheets 36 and 38 (Fig. 3) of plastic material are arranged at opposite sides of the housing 22 and are forwardly and downwardly inclined or curved to define with the aid of the instrument panel 24 and enclosed chamber 40 in which conduits and other mechanisms may be installed. A flange 42 is formed on each side of the housing 22 and the sheets 36 and 38 may be attached thereto by means of bolts 44. Conveniently, the housing 22 may be made of a suitable plastic composition which is easily moldable into complex shapes such as herein disclosed.

The forwardly extending edge of the instrument panel 24 is spaced from the windshield 26 by means of an elongated and arcuate plate 48. The latter plate is slotted as at 50 and is provided with a lip 52 by means of which air may be directed against the rearward and interior side of the windshield 26. The cowl 28 is so formed to provide a transverse chamber 54 for supplying air to the slot 50.

A second duct 60 is provided having an air inlet 62 at the right front portion of the vehicle 10 and this duct is caused to communicate through a fan 64 and a heater core 66 with a distribution chamber 68 mounted on the engine side of the fire wall 30. A valve 69 is arranged to pivot within the conduit 60 between the fan 64 and the heater core 66. An adaptor chamber 70 is utilized for connecting the valved portion of the conduit 60 to the chamber 68. Two ports 80 and 82 are formed in the fire wall 30 and these are arranged to conduct air from the chamber 68 to a heating duct 84 and a defroster manifold 86, respectively. The heating duct 84 extends downwardly and rearwardly and then diverges with grill outlets 90 and 92 placed in opposite sides of the housing 22 for communication with two zones in the compartment 15. The relation of the housing 22 to the two zones or spaces is such as to ensure effective conditioning of the air in those spaces.

The manifold 86 has two conduits 94 and 96 which are adapted to conduct air to the chamber 54. Two elbows, such as the elbow 97, are provided for connecting the conduit 94 and 96 to the chamber.

Figure 2:
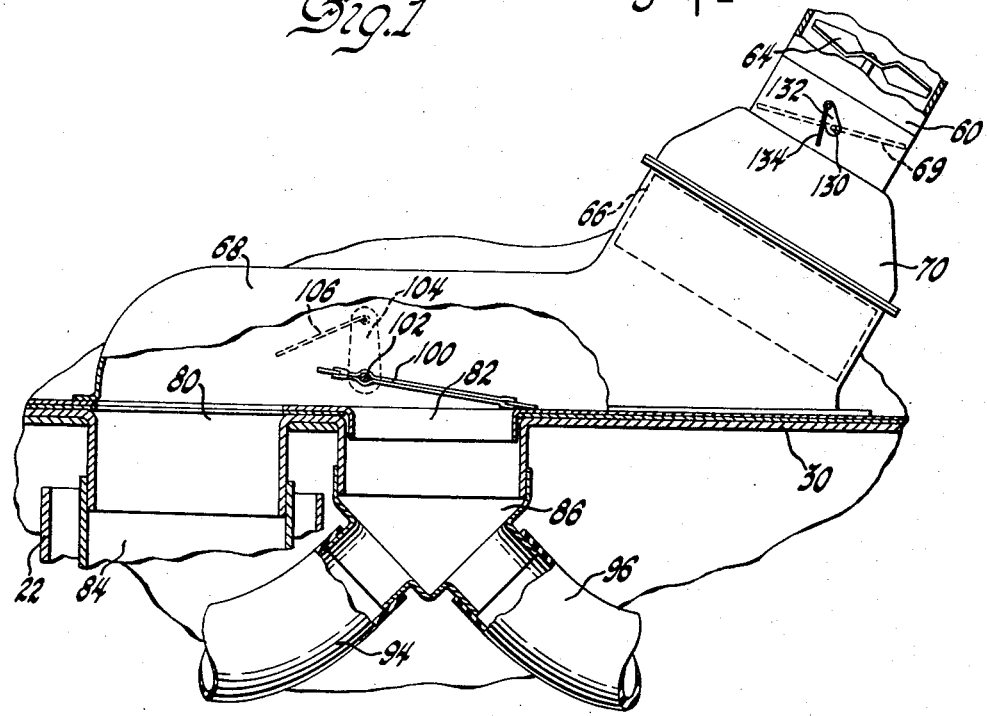
Fig. 2 is an enlarged detail view showing some of the elements illustrated in Fig. 1 and portions being broken away.
Figure 5:
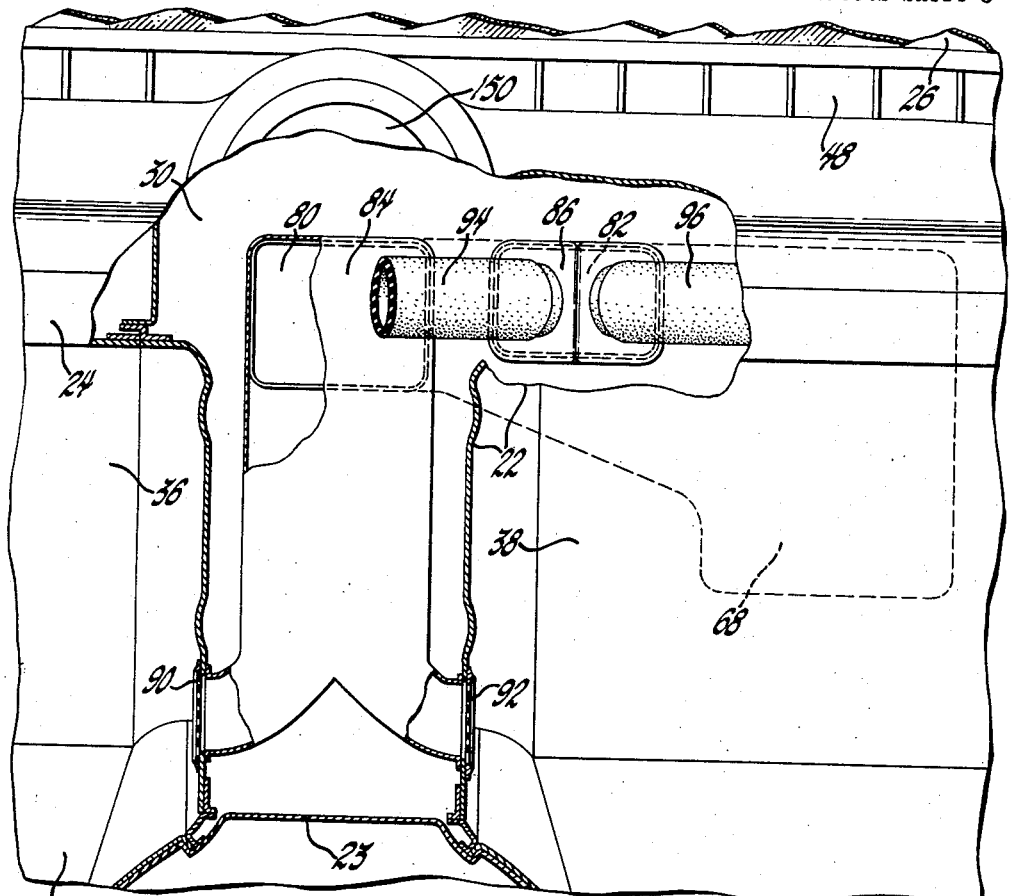
Fig. 5 is an elevational view looking toward the instrument panel of the vehicle shown in Fig. 1 with parts in section showing the duct construction.

A valve 100 is affixed to a shaft 102 journaled in the upper and lower walls of the chamber 68 and to one end of the shaft 102, outside the chamber, is affixed a lever 104. A Bowden wire 106 is pivotally attached to the end of the lever 104. The position of the shaft 102 and the sides of the valve 100 is such as to deflect or block off the passage of air from the chamber 68 to the port 82 leading to the defrosters when the valve is positioned as shown in Fig. 2. In such a situation, the air is forced into the heating duct 84 and downwardly into the two passenger spaces. When the valve is swung counterclockwise and to its extreme position, all air is cut off from the port 80 and the port 82 is fully opened to secure prompt and effective windshield defrosting. Intermediate positions of the valve 100 determine the proportions of the airflow forced to the heating duct and the defroster chamber 54.

A conventional temperature regulating valve 110 is mounted on the fire wall 30 and is fitted with two hose connections 112 and 114 for conducting hot water from the vehicle engine to the heater core 66. The valve 110 controls the amount of water flowing through the core and therefore regulates the temperature of the air passing therethrough. A valve of this type is disclosed in the United States Letters Patent No. 2,602,593, issued July 8, 1952 in the name of E. C. Raney. Another hose connection 116 is provided for conducting water from the core 66 back to the engine. A Bowden wire and sheath arrangement 120 is connected to the valve 110 and extends to the instrument panel 24. A knob 122 is provided on the panel 24 for controlling the valve 110 by means of the Bowden wire.

The Bowden wire 106 for controlling the valve 100 leads through a protective sheath, not shown, and is arranged to be manipulated by means of a knob 124 protruding from the instrument panel 24 immediately to the right of the knob 122.

The damper valve 69 is affixed to a shaft 130 which is arranged to be turned by means of a lever 132 and a Bowden wire 134 pivoted to one end of the lever. The wire 134 is protected by a sheath, not shown, and is arranged to be moved lengthwise by means of a knob 136 protruding from the housing 22.

The Bowden wire within the sheath and wire arrangement 18 for the valve 16 extending rearwardly through the housing 22 and is fitted with a knob 140.

The housing 22 is ornamental in its nature and is adapted to support instruments such as diagrammatically illustrated at 150, 152 and 154, as well as additional controls 156 and 158 which may be necessary in operating the vehicle.

Operation of the heating, ventilating and defrosting system may be understood from the above description for it may be seen that fresh air may be admitted through the duct 12 by a suitable manipulation of the knob 140, and air may be admitted in suitable proportions to the heating duct 84 or the defroster compartments 54 by proper actuation of the valves 69 and 100 through the control knobs 136 and 124.

Assuming that no defrosting effect is desired, all air may be passed from the fan 64 through the port 80 to the heating duct 84 by placing the valve 100 in its position as depicted in Fig. 2. This air may either merely ventilate or it may heat the two passenger compartment spaces dependent upon the adjustment of the temperature control valve 110.

In the event a defrosting effect is desired upon the windshield 26, a pull on the knob 124 will rotate the valve 100 in a counterclockwise direction, as viewed in Fig. 2, and divert some of the air into the manifold 86.

I claim:

In an automotive vehicle having an instrument panel and a fire wall separating a passenger compartment from an engine compartment, a vertically disposed and hollow housing extending a substantial distance from said fire wall into said compartment and joined to said panel to define side-by-side separate passenger zones, a valve controlled first duct leading from the front of said vehicle to one of said zones for ventilation purposes, an air distributing chamber supported on said fire wall, a port leading from said chamber through said fire wall, a second duct leading from the front of said vehicle, a fan and heater core arranged in cooperation with said second duct to direct air to said port by way of said chamber, a heating duct enclosed within said hollow housing having one end in communication with said port and outlets passing through opposite sides of said housing, and means for controlling air flow through said port and outlets whereby a heating effect may be applied to each of said zones free of air currents of the other zone.

References Cited in the file of this patent

UNITED STATES PATENTS

| | | |
|---|---|---|
| 2,130,686 | Kateley et al. | Sept. 20, 1938 |
| 2,235,642 | Lintern et al. | Mar. 18, 1941 |
| 2,391,408 | Galamb et al. | Dec. 25, 1945 |
| 2,445,392 | Findley | July 20, 1948 |
| 2,518,356 | Mieras et al. | Aug. 8, 1950 |
| 2,612,829 | Joyce | Oct. 7, 1952 |
| 2,634,670 | Simons | Apr. 14, 1953 |
| 2,678,597 | Simons | May 18, 1954 |
| 2,718,839 | Wilfert | Sept. 27, 1955 |